United States Patent
Grassadonia et al.

(10) Patent No.: US 9,972,009 B2
(45) Date of Patent: *May 15, 2018

(54) PROVISIONING ACCOUNT NUMBERS AND CRYPTOGRAPHIC TOKENS

(71) Applicant: SQUARE, INC., San Francisco, CA (US)

(72) Inventors: Brian Grassadonia, San Francisco, CA (US); Ayokunle Omojola, San Francisco, CA (US); Joachim Bekmann, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/679,968

(22) Filed: Aug. 17, 2017

(65) Prior Publication Data
US 2018/0005231 A1     Jan. 4, 2018

Related U.S. Application Data

(63) Continuation of application No. 15/199,457, filed on Jun. 30, 2016, now Pat. No. 9,741,036.

(51) Int. Cl.
*G06K 5/00* (2006.01)
*G06Q 20/40* (2012.01)
*G06Q 20/34* (2012.01)

(52) U.S. Cl.
CPC ......... *G06Q 20/401* (2013.01); *G06Q 20/354* (2013.01); *G06Q 20/405* (2013.01)

(58) Field of Classification Search
CPC ... G07F 19/20; G07F 7/1008; G06Q 20/1085; G06Q 20/341

(Continued)

(56) References Cited

U.S. PATENT DOCUMENTS

| 5,221,838 | A | 6/1993 | Gutman et al. |
| 5,768,521 | A | 6/1998 | Dedrick |

(Continued)

FOREIGN PATENT DOCUMENTS

| WO | 2007/008686 A2 | 1/2007 |
| WO | 2018/005635 A2 | 1/2018 |

OTHER PUBLICATIONS

United States Notice of Allowance issued in U.S. Appl. No. 15/199,457 dated Apr. 21, 2017.

(Continued)

*Primary Examiner* — Karl D Frech
(74) *Attorney, Agent, or Firm* — Baker Botts L.L.P.

(57) ABSTRACT

Disclosed herein are systems and methods for real-time provisioning of new card numbers to users of a consumer computing system. A consumer computing system ("CCS") may have servers and databases situated within a banking infrastructure in order to provide various features to users via a software application executed by a client device. The software application may interact with the CCS servers, such that the CCS servers and the software application offer the client device and the user certain features not ordinarily available in conventional banking infrastructures. These features may include the real-time provisioning of card numbers for a user's banking account. In operation, the client device may submit a request for a new card number to a CCS server, which may be generated in real-time and active in the payment stream when the card number is generated.

34 Claims, 6 Drawing Sheets

(58) Field of Classification Search
USPC .................................. 235/380, 379, 382
See application file for complete search history.

(56) References Cited

U.S. PATENT DOCUMENTS

| | | |
|---|---|---|
| 5,884,288 A | 3/1999 | Chang et al. |
| 5,963,926 A | 10/1999 | Kumomura |
| 6,115,601 A | 9/2000 | Ferreira |
| 8,082,196 B2 | 12/2011 | Mullan et al. |
| 9,741,036 B1 * | 8/2017 | Grassadonia ........ G06Q 20/401 |
| 2010/0089998 A1 | 4/2010 | Sandstrom et al. |
| 2018/0005203 A1 | 1/2018 | Grassadonia et al. |
| 2018/0005229 A1 | 1/2018 | Grassadonia |
| 2018/0005323 A1 | 1/2018 | Grassadonia |

OTHER PUBLICATIONS

United States Non-Final Office Action issued in U.S. Appl. No. 15/199,457 dated Sep. 15, 2016.
Non-Final Office Action dated May 1, 2017, for U.S. Appl. No. 15/198,793, of Grassadonia, B., filed Jun. 30, 2016.
Final Office Action dated Nov. 16, 2017, for U.S. Appl. No. 15/198,793, of Grassadonia, B., filed Aug. 17, 2017.

* cited by examiner

PROVISIONING ACCOUNT NUMBERS AND CRYPTOGRAPHIC TOKENS

This application is a continuation of U.S. application Ser. No. 15/199,457, filed Jun. 30, 2016, entitled "Provisioning Account Numbers and Cryptographic Tokens," of which is incorporated by reference in its entirety herein.

BACKGROUND

Conventional banking and payment computing infrastructures are often limited in the types of consumer-facing features they may provide. This is due to the monolithic systems, lacking in robust features and programmability, used to conduct payment transactions in a highly-regulated environment. Typically, each actor or service has a defined role or set of tasks that are performed by the particular service's computing systems in accordance with the appropriate technical protocols and legal obligations. Because these computing systems do not have a dynamic feature set and cannot be used to perform tasks beyond their initial configurations, and because these systems can only conduct transactions and execute certain processes falling within boundaries defining those initial configurations, the existing banking and payment computing infrastructure cannot offer robust and sophisticated features. As such, users are often limited in the types of computing features they can expect from financial companies.

Financial institutions whose systems are already part of the existing banking infrastructure are beginning to provide some new features to users, such as aggregating transaction data from across multiple accounts. And there is a growing number of third-party computing services that offer consumers similar new features. These new features can take the form of web-based applications, mobile applications, and application programmable interfaces (API) that interact with one of the various existing systems in the conventional infrastructure. However, these new features are also limited in their sophistication and capabilities, because the systems offering these features are merely gathering transaction data reported from some external system.

BRIEF DESCRIPTION OF THE DRAWINGS

The accompanying drawings constitute a part of this specification and illustrate embodiments together with the specification, in order to explain the various aspects of the subject matter disclosed herein.

DETAILED DESCRIPTION

Disclosed herein are systems and methods for real-time provisioning of new card numbers to users of a consumer computing system. A consumer computing system ("CCS") may have servers and databases situated within a banking infrastructure in order to provide various features to users via a software application executed by a client device. The software application may interact with the CCS servers, such that the CCS servers and the software application offer the client device and the user certain features not ordinarily available in conventional banking infrastructures. These features may include the real-time provisioning of card numbers for a user's banking account. In operation, the client device may submit a request for a new card number to a CCS server, which may be generated in real-time and active in the payment stream when the card number is generated.

Conventional monolithic financial systems required consumers to wait several days to receive a new credit or debit card in the mail. This is due to the manual or semi-automated fashion in which new card numbers were generated and the resulting cards were distributed. In conventional systems, consumers would request a new card from an issuing entity, usually a consumer-facing bank (e.g., Chase®, Bank of America®, Citi®), by mail or online. The issuing entity would then take several days to confirm whether to issue the card and then sends a physical card to the consumer. Once the consumer received the card, the consumer would have to activate the card, which is an additional step of the conventional process requiring the consumer to ask the issuing entity to activate and acknowledge the card number of the new card. In contrast, embodiments disclosed herein, and variations thereof, employ one or more servers of a consumer-facing computing system inserted and deployed within the conventional financial processing system, allowing the consumer computing system to tap into the financial processing system in a new way, thereby facilitating a number of consumer-oriented feature sets. For instance, by having the servers of the consumer-facing system inserted into the financial services stream where others were not previously, new card numbers may be generated and sent directly to an application at a consumer device (e.g., smartphone, tablet). When the card numbers are generated, they may be active and useable before the card number is even received by the consumer. Thus, the systems and methods disclosed herein may provision new card numbers for consumers in real-time, which may be useable by the consumer via their device, without needing to wait for physical card to arrive in the mail.

By extension, new security measures may be necessary to protect consumers from fraud, as the new card numbers are active by the time the consumer receives the card number. To address this concern, the systems and methods disclosed herein may provide new server behaviors to protect consumers from fraud through improved, intelligent server behaviors, which were not previously possible because servers were not deployed into the financial services stream in this manner.

Example System Components

Payment System with Consumer Computing System (CCS)

Figure 1:
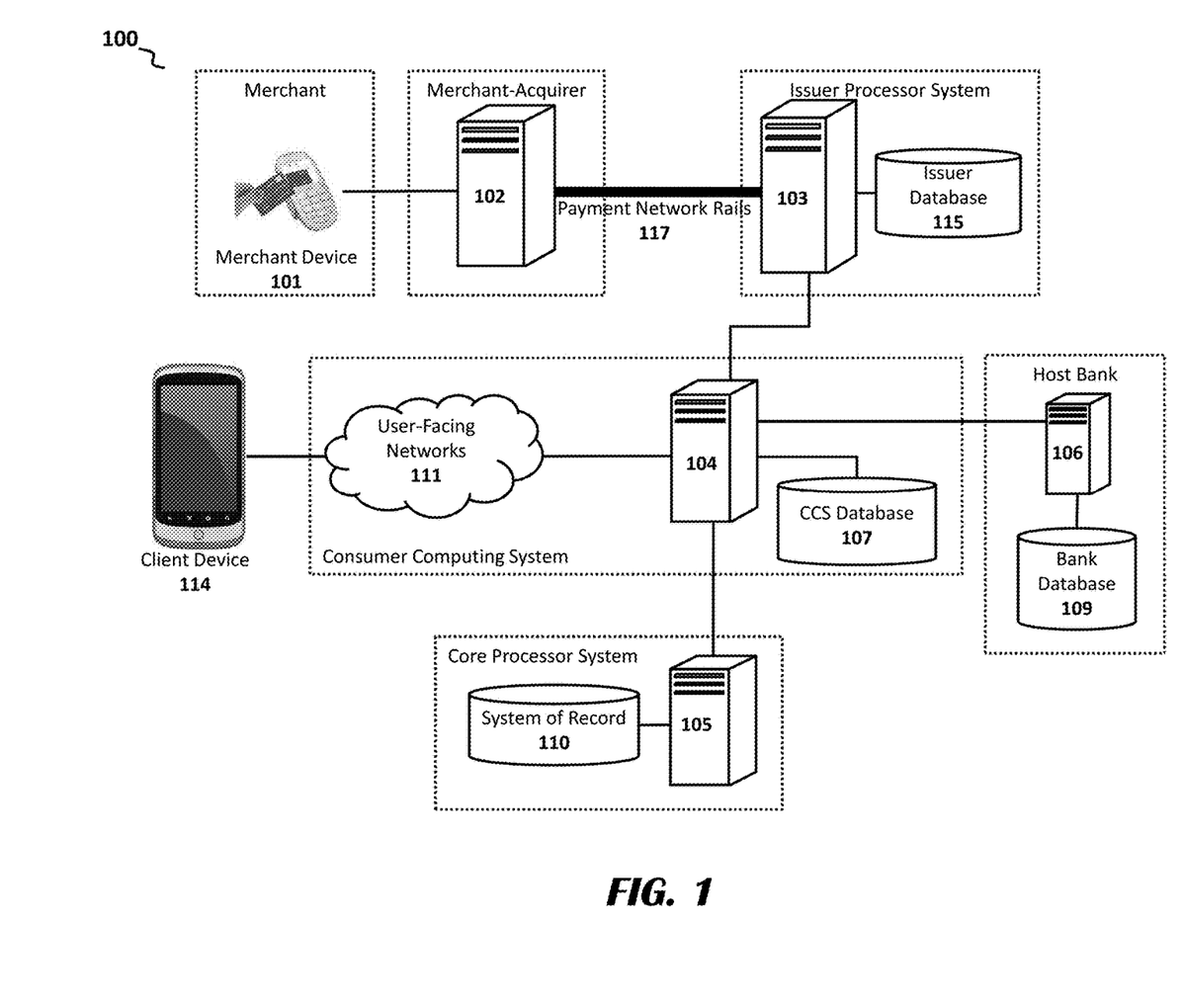
FIG. 1 illustrates an embodiment of a system that includes several servers that handle various steps in a computerized system for tracking debit and credit transactions.

FIG. 1 illustrates an embodiment of a system 100 that includes several servers that handle various steps in a computerized system for tracking debit and credit transactions. The example system 100 may comprise a plurality of entity systems associated and operated by various entities of the system 100, including a merchant, merchant-acquirer, issuer processor, consumer computing system ("CCS"), host banking system working in collaboration with the CCS to provide user-oriented services, and core processor system.

Each of the example entity systems may comprise any number of electronic devices (e.g., merchant computing devices 101, server computers 102, 103, 104, 105, 106) that execute the various processes described herein and networking devices that facilitate intercommunications between the various entities. One having skill in the art will appreciate that embodiments may comprise additional or alternative entity systems; and that some embodiment may omit or combine certain entity systems of the example system 100 shown in FIG. 1.

Merchant Computing Device

A merchant computing device 101 may be employed by a merchant to request payment authorization for a particular transaction. The merchant computing device 101 may be any device capable of capturing payment request data from various types of payment instruments, and then transmitting payment authorization requests containing the request data to various components of a system 100. Non-limiting examples of a merchant computing device 101 may include a point of sale (POS) terminal, a credit card payment processing terminal (e.g., a credit card scanner), and a cash register. Non-limiting examples of payment instruments may include magnetic stripe cards, EMV cards, and virtual cards that may be stored on a client device 114. As mentioned, the merchant computing device 101 may comprise or may be coupled to various types of instrument readers configured to capture transaction data from certain types of payment instruments. For instance, if the payment instrument is a virtual card stored on a client device 114, and the client device 114 is configured to transmit payment request data for the virtual card using near field communications (NFC), then the merchant computing device 101 may comprise or may be coupled to an NFC scanner configured to capture the transaction data related to the virtual card via the NFC signal received from the client device 114.

In operation, a merchant computing device 101 may capture payment transaction data, such as a card identifier (CID) or card number, and then transmit the payment transaction data to a merchant-acquirer server 102. The merchant computing device 101 may be configured to generate digital messages containing the payment authorization request and transaction data, which, in some embodiments, may be generated according to particular protocols or specifications. For example, the merchant computing device 101 may generate a payment authorization request according to one or more ISO standards in which the payment authorization request contains certain fields of payment transaction data. Non-limiting examples of data fields that may be included the digital message may include a merchant identifier (merchant ID), a merchant category code (MCC), an amount for the transaction, a timestamp (e.g., data, time), and a card number. In some implementations, the merchant computing device 101 may transmit the digital message to containing the card and/or other payment information to a merchant-acquirer server 102, although in some implementations, the digital message may be transmitted to other devices, such as an issuer processor server 103 of an issuer processor system.

Merchant-Acquirer

Merchant-acquirers may be financial institutions that process credit or debit card payments on behalf of a merchant. A merchant-acquirer may be configured to receive payments from banks that issue payment cards within a payment network entity (also referred to as a payment network association entity); examples of payment network entities may include Visa®, MasterCard®, Discover®, and American Express®. A merchant-acquirer server 102 may be any computing device configured to communicate, over predetermined payment network rails 117, digital messages containing payment transaction data to and from one or more merchant computing devices 101, as well as transaction data to and from the issuer processor server 103. In operation, the merchant-acquirer server 102 may perform one or more processes on the digital message, and forward at least some of the payment transaction data collected by the merchant computing device 101 to the issuer processor server 103 over the payment network rails 117 of a particular payment network entity (e.g., Visa® or MasterCard® networks). In some implementations, the merchant-acquirer server 102 may forward to the merchant computing device 101 payment authorization response messages from the issuer processor server 103, indicating whether the payment was authorized or declined.

In operation, the merchant computing device 101 may capture payment card information and then generate and transmit a digital message, such as a payment authorization request, comprising the payment card information along with transaction data (e.g., transaction amount, merchant identifier) to a merchant-acquirer server 102. The merchant computing device 101 may be configured to generate digital messages containing the payment authorization request, which includes the payment card information and transaction data, may be generated according to particular protocols or specifications, e.g., one or more ISO standards in which the payment authorization request can contain certain fields for the payment card information and the transaction data. Non-limiting examples of data fields that may be included the digital message may include a merchant identifier (merchant ID), a merchant name, a merchant category code (MCC), an amount for the transaction, a timestamp (e.g., data, time), and a card number. In some implementations, the merchant computing device 101 may transmit the digital message containing the card and/or other payment information to a merchant-acquirer server 102, although in some embodiments, the digital message may be transmitted to other devices, such as an issuer processor server 103 of an issuer processor system.

Payment Network Association and Payment Network Rails

Payment network entities (e.g., Visa®, MasterCard®, American Express®) may be entities that operate payment network rails 117, which may be a computing communications network configured to receive and transmit digital messages between and among merchant computing devices 101 and merchant-acquirer servers 102, as well as messages between merchant-acquirer servers 102 and issuer processor server 103. In operation, merchant computing devices 101 and merchant-acquirer servers 102 may generate, manipulate, and transmit digital messages containing payment transaction request messages and payment transaction data. The digital messages may be generated and manipulated according to the policies, standards, and protocols implemented by each particular payment network.

Issuer Processor

Issuer processor systems can establish payment card number records for customers, issue bills and statements, and process payments. The issuer processor server 103 can perform these functions and store transactions and payment card numbers in a storage device, such as an issuer database 115. Issuer processors will typically forward payment authorization requests to a core processor server 105. However, the example system comprises a CCS server 104 positioned between issuer processor server 103 and core processor server 105. Furthermore, the CCS server 104 can perform some or all of the functions typically associated with issuer processors, and therefore, in these embodiments, the merchant-acquirer server 102 can communicate over the payment network rails with the CCS server 104. Although the issuer processor server 103 and the CCS server 104 are shown as separate computing platforms, the issuer processor server 103 and the CCS server 104 can be implemented as a single platform. The positioning of the CCS server 104 between issuer processor server 103 and core processor server 105 allows the CCS server 104 to provide added functionality to the system, such as intervene in and record transactions in the payment stream (e.g., intercept payment authorizations). As a result, the CCS server 104 can also have access to all transactions associated with an account to provide further services to the client device 114 associated with the account.

In some embodiments, the issuer processor server 103 may be configured to generate a cryptogram token for a payment card number, according to various predetermined algorithms and requirements associated with a digital wallet application executed by a client device 114. The CCS server 104 may transmit a new payment card number to the issuer processor server 103 after the CCS server 104 generates the payment card number. In some instances, the CCS server 104 may transmit a token that was generated by the CCS server 104 to represent the payment card number, based on predetermined tokenization algorithms promulgated by the CCS server 104. However, the client device 114 may execute one or more digital wallet applications allowing the client device 114 to securely store payment card numbers and conduct payment transactions using the client device 114 instead of a physical payment card. The issuer processor server 103 may generate the cryptogram token for the payment card, using the payment card number and additional input parameters, and may transmit the cryptogram token directly or indirectly (through the CCS server 104) to the client device 114 for storage and use in digital wallet-based transactions.

Host Bank

A host bank may be a third-party financial institution that works in collaboration with the CCS to provide various services to users through consumer-facing applications. The host bank system may have a bank server 106 and bank database 109. The bank server 106 may communicate with a CCS server 104 via one or more networks, and may be any computing device comprising a processor configured to execute the various processes and tasks described herein. In operation, the bank server 106 may generate new bank accounts and may interact with the CCS, issuer processor system, and a core processor system to debit or credit the various bank accounts managed by the host bank system. The host bank may have a bank database 109 that may store banking data for various accounts, including routing numbers, account numbers, and account ledgers, among other types of information. The bank server 106 may generated and update records of the bank database 109 based on new and updated account information received from the various entities, according to account update requests and transaction data.

In some embodiments, the CCS may have one or more accounts with the host bank and user funds may be deposited into the account, where user-owned monies are tracked according to ledgers and user records in a CCS database 107. In such embodiments, the bank server 106 may generate a routing number and account number for the CCS, and various forms of information about the CCS and transactions may be tracked in the bank database 109. Users who use the CCS services to facilitate payments or for other services may deposit funds into the account of the CCS held at the host bank. The CCS server 104 may update a record of the user in the CCS database 107 to reflect the amount of user money held in the CCS account at the host bank. The bank server 106 may update the amount of money in the CCS account reflected in the account data and ledgers stored in the bank database 109, based on various transaction request messages received from the CCS server 104. The CCS server 104 may similarly update the amount of money belonging to the user in the CCS database 107, based on various transactions.

In some embodiments, the host bank may open and manage a financial account for each user registered in the CCS database 107. In such embodiments, the bank server 106 may receive instructions from the CCS server 104 to open a new account for a user, when the user registers with the CCS services, in response to some other trigger or instruction received from the CCS server 104. The bank server 106 may execute one or more Know-Your-Customer (KYC) processes designed for collecting certain types of information about the user. In some cases, the bank server 106 or the CCS server 104 may generate one or more graphical user interfaces (GUIs) configured to receive user information from the client device 114. And in some cases, the CCS database 107 may contain the requisite KYC process data in a record of the user, which the CCS server 104 may transmit to the bank server 106. The bank server 106 may generate one or more records for the user in bank databases 109, which may include generating a bank account number for the user. The bank server 106 may transmit the host bank account information for the user to the CCS server 104, where the information may be stored into a record for the user in the CCS database 107, identified by a user ID associated with the user.

Consumer Computing System (CCS)

A consumer computing system ("CCS") may comprise CCS servers 104, which may be any computing device capable of performing various tasks and processes described herein. A CCS server 104 may comprise a memory and a processor, whereby the memory comprises a set of computer-readable instructions that are executed by the processor. Although the CCS server 104 is shown as a single server, it should be appreciated the functionality of a CCS server 104 may be performed by any number of computing devices. In the example system 100, a CCS server 104 may be coupled to issuer processor servers 103 and core processor servers 105, such that the CCS server 104 may be situated between the issuer processor system and the core processor system. As mentioned previously, it should be appreciated that in some embodiments the CCS server 104 may be configured to execute tasks and processes of an issuer processor server 103, such that the CCS may function as an issuer processor system. It should also be appreciated that in some embodiments the CCS server 104 may additionally or alternatively be configured to perform various tasks and processes of a core processor server 105, such that the CCS may function as a core processor system.

Additionally, the CCS system may have one or more CCS databases 107 that store records of users, account and transaction ledgers, and other forms of information. A CCS database 107 may be hosted on the machine-readable storage of one or more computing devices, such as servers, laptops, and desktops, among other types of computing devices. The CCS databases 107 may comprise or may otherwise be coupled to a CCS server 104 via one or more internal networks (not shown), within the operational boundaries of CCS network devices.

A CCS database 107 may include a user account database that stores user profile records containing data fields for various types of data; non-limiting examples of information stored in records of the user account database may include user identifiers (user ID), user payment card numbers, transaction data, bank account data, and machine-readable tokens representing payment card numbers, among other types of information about users and user accounts. In operation, a CCS server 104 may generate and update a user record according to registration or demographic data received from the client device 114 during a registration process; and according to transaction data received from the client device 114 or other entities of the system 100, such as the host bank, issuer processor, and core processor, among other entities, during other processes.

As an example of processes affecting a CCS database 107 containing user information, in embodiments where the host bank holds accounts for each individual user, during a registration process the CCS server 104 may receive a new account request and various types of user information and client device data from a client application published by the CCS and executed by the client device 114. The CCS server 104 may forward the request to a bank server 106 that may generate a new financial account for the user in the bank database 109, which may include generating and returning to the CCS server 104 the routing number of the host bank and a unique account number for the user's new financial account. The CCS server 104 may store into the user profile record of the CCS database 107, the data about the user, the data associated with the client application and/or the client device 114, and the data associated with new account held at the host bank. Alternatively, in embodiments where the host bank manages accounts for the CCS entity, during the registration process the CCS server 104 may generate the user record in the CCS database 107, and may update the user record to reflect amounts deposited or debited, into or out of the CCS account held at the host bank. The CCS server 104 may also receive from the client device 114 and store into the user profile record of the CCS database 107, the data about the user, the data associated with the client application and/or the client device 114.

As another example of a process affecting a CCS database 107 that contains user information, the CCS server 104 may receive a new card request from the client application executed by the client device 114, thereby prompting the CCS server 104 to execute various processes for generating a unique new payment card number for the user. The CCS server 104 may generate the payment card number and store the payment card number into the user record of the CCS database 107. In some implementations, the CCS server 104 may execute a tokenization algorithm to generate a token that represents the payment card number, such that the token may operate as an alias or encoded representation of the payment card number. In such implementations, the CCS server 104 may store the token into the CCS database 107 records for the user, and may then exchange the token with various devices of the system 100 during operational processes, allowing the devices to communicate transaction data using the token instead of transmitting the payment card number "openly" over the various computing networks. The CCS server 104 may transmit the token and/or payment card number to the client device 114 for storage and later usage. In addition, the CCS server 104 may transmit the payment card number to the issuer processor server 103, the bank server 106, and/or core processor server 105, or other computing device of entities that would require the payment card number generated for the user prior to any transactions being conducted using the payment card number.

A CCS server 104 can communicate transaction data to a core processor server 105, which may record the payment authorization and other transaction data into a system of record database 110 and may further report the transaction data to the Federal Reserve and/or other entities that may be associated with the transaction. Although the core processor server 105 may transmit response messages indicating whether a transaction request associated with a user's payment card number should be authorized, The CCS server 104 may make various determinations whether to confirm or otherwise authorization payments based on certain criteria, such as whether the transaction would cause an overdraft on the user account; such criteria may additionally or alternatively consider the recommendation of the response message, unless the recommendation to reject the transaction based on a legal authority to deny the transaction. In some implementations, the CCS server 104 may be configured to reject all transaction requests until a request to activate a payment card number has been received from an authorized client device 114 associated with the user. Conventional systems may take several days to activate a new payment card and payment card number. But unlike conventional payment systems, a CCS server 104 may be situated between the host bank and issuer processor, and thus the payment card numbers are capable of being active and used in real-time, the moment the card number is generated. As such, the CCS server 104 transmits an active card number to the client device 114, among other parties of the system 100. For the user's protection, because the payment card is indeed active when the payment card number is transmitted to the client device 114, the CCS server 104 may reject all payment transaction requested by default. Likewise, the activation status of the payment card number in a user record in the CCS database 107 may indicate that the card number has not been activated yet. The CCS server 104 may prompt the user, via a client-side GUI presented on the client device 114, to activate the card, even though the card is indeed active. The activation request from the client device 114 may instruct the CCS database 107 to update the activation status of the payment card number in the user profile to indicate the card has been activated, and thus the CCS server 104 may authorize payment transaction satisfying any other criteria that might be verified by the CCS server 104.

Devices of the CCS may include, or may otherwise be coupled to, one or more user-facing networks 111, such as the Internet, through which client devices 114 of users may access the CCS server 104 and CCS databases 107. One having ordinary skill in the art would appreciate that the user-facing networks 111 may comprise any number of hardware and software computing-communications components configured to support communications between the client devices 114 and the CCS server 104, where at least some of the networks 111 include internet protocol (IP) based networking technologies that allow the client devices 114 to communicate with the CCS server 104. Non-limiting examples of components of the user-facing networks 111 may include routers, switches, firewalls, and the like.

Core Processor and System of Record

A core processor may be a financial institution responsible for authorizing transactions, releasing funds, managing a system of record database 110, and conducting various transaction and identity verification processes. The core processor entity may be a bank or a third party that provides software services to the bank allowing the bank to function as the core processor. Some financial institutions may maintain core processor servers 105 internal to the financial institution network boundaries. It should be appreciated that in some implementations the various entities may function as a core processor entity. For instance, in some circumstances, the core processor and the host bank may be the same entity, and thus the computing devices may be the same devices.

A core processor server 105 receives and updates a system of record database 110 that maintains the accurate information of the balance of an account maintained by various banks. Transactions may be pending or in various stages of the payment stream, but the official recordation of those transactions is by the system of record database 110. Certain parties, such as the account owner (e.g., user, CCS), the merchant, the issuer processor, or the CCS, may assume certain risks that an account holder does not have sufficient funds to fund a transaction, until the core processor server 105 authorizes the transaction and records the transaction in the system of record database 110.

In operation, when a CCS server 104 receives a payment authorization request from a merchant computing device 101 via the various entities and devices, the CCS server 104 can forward the associated transaction information to core processor server 105, which maintains an account corresponding to the payment card used in the payment transaction. The system of record database 110 may manage the account information using the core processor server 105, along with a ledger of transactions for the account and other user profile information. In some cases, the core processor server 105 may transmit account information, such as an indication for an amount of funds available to cover a transaction amount, to the CCS server 104. The CCS server 104 may determine based on preconfigured criteria whether to authorize the transaction based upon the account information received from the core processor server 105. As previously mentioned, in some embodiments, the CCS server 104 may be configured to deny all transactions associated with a payment card number associated with a user profile in the CCS database 107 until the an activation request is received from the user via an authorized client device 114 associated with the user, as indicated by the user profile record stored in a CCS databases 107. The CCS server 104 may be configured to make additional or alternative determinations regarding authorizing payment transaction requests independent of the core processor server 105 determinations and indications. For instance, the CCS server 104 may reject transaction requests associated with the payment card number of the user when the CCS server 104 determines that there would be overdraft the account, even though the bank hosting the account of the user would permit the overdraft.

The CCS server 104 can communicate transactions to the core processor server 105, which may update the system of record database 110 transaction information associated with user accounts registered with the CCS services. The core processor server 105 may further report the transaction data and the daily ledger results in the system of record database 110 to the Federal Reserve and any other banks that maintain account records associated with the payment card used in payment authorizations and transactions. In some instances, the core processor server 105 may generate an authorization response that may be forwarded through the CCS server 104 to various devices and entities of the system 100 (e.g., merchants, issuer processor, merchant-acquirer, merchant), in order to confirm how the merchant may complete the payment transaction, indicating whether the transaction request was authorized or rejected by any particular entity in the payment authorization stream of the system 100.

In the conventional payment stream, an issuer processor typically forwards payment authorization requests to a core processor server 105. However, according to embodiments described in the disclosure, such as the example system 100, and variations of such embodiments, a CCS server 104 is situated between an issuer processor server 103 and a core processor server 105. Situating the CCS server 104 between issuer processor server 103 and core processor server 105 allows for the CCS server 104 to intervene in and record transactions in the payment stream, such as payment authorizations. Consequently, the CCS server 104 can have visibility into data generated for all transactions associated with a user's account and payment card number to provide additional services to the user using the account. As such, the CCS server 104 may execute additional features and transaction processes that were not available in the conventional payment and financial systems. Furthermore, the CCS server 104 can perform some or all of the functions typically associated with issuer processors, and therefore, in some embodiments, the merchant-acquirer can communicate directly with the CCS server 104. In other words, some embodiment may facilitate collapsing the number of entities required to be involved in conventional payment transaction processing streams.

Client Device

A client device 114 may be any computing devices capable of executing a locally-installed application or accessing a web-based application executed by a CCS server 104. Non-limiting examples of client devices may include s mobile phone, tablet, smart watch, personal data assistant, gaming console, and personal computer, among other computing devices. The client device 114 may transmit various forms of device data with user data, during registration, authorization, and verification processes. For example, during a registration process, the user may input into a registration GUI presented on the client device 114, demographic information associated with the user (e.g., name, DOB, addresses, social security number). In addition, the client application may query a MAC address of the client device 114 and an IP address of the client device 114, as well as other types of information about the client device 114. The device data may be submitted with the user data during the registration process, and may be stored in the user record in the CCS database 107. As another example, a tokenization algorithm designed to mask the actual payment card number generated by the CCS server 104 may use data inputs, such as the user ID of the user and/or a device identifier (device ID) associated with the client device 114; the device ID may be generated by the CCS server 104 according to various input values, or the device ID may be an existing data field, such as the MAC address of the client device 114. As mentioned, the client device 114 may access and communicate with the CCS server 104 over one or more user-facing networks 111 (e.g., the internet).

Generating Payment Card Numbers

Figure 2:
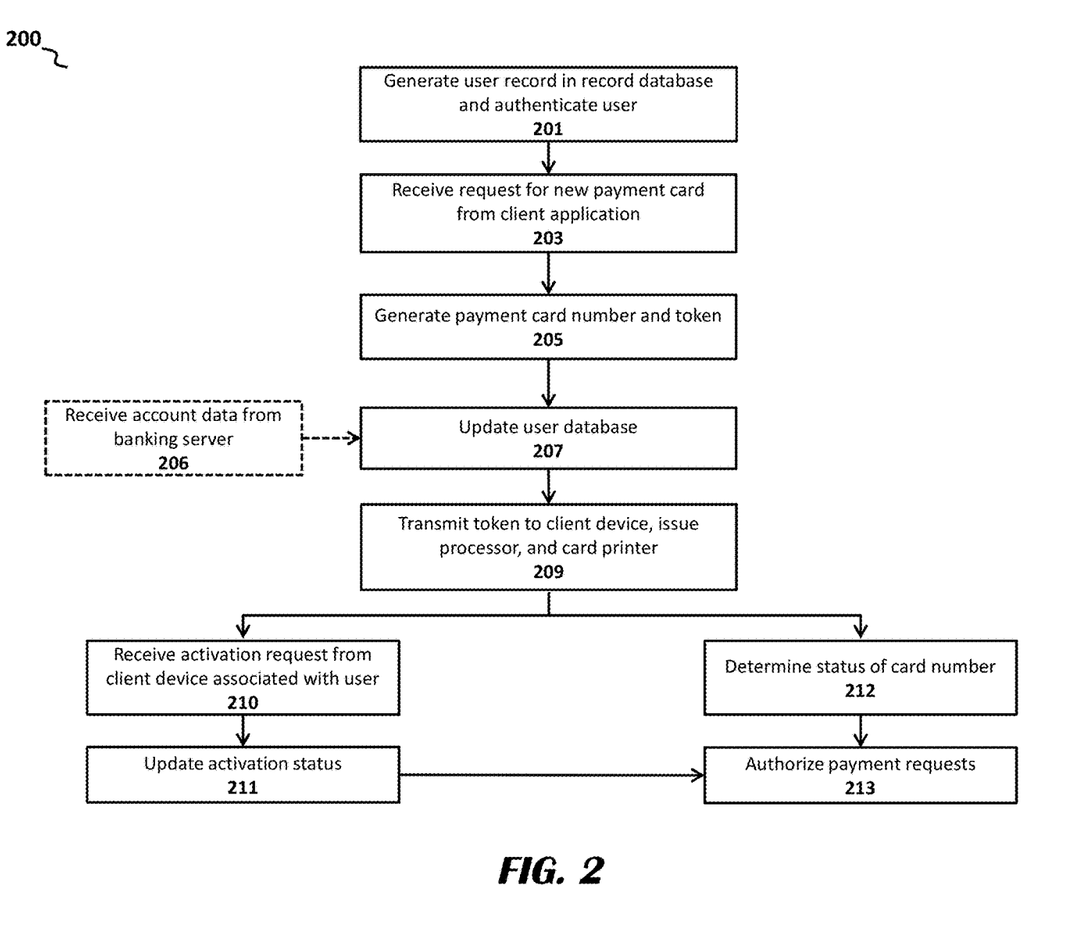
FIG. 2 shows execution of a method of provisioning a payment card number to a user, according to an example embodiment.

FIG. 2 shows execution of a method 200 of provisioning a payment card number to a user, according to an example embodiment. The example method 200 comprises steps 201, 203, 205, 207, 208, 209, 211, and 213. However, it should be appreciated that some embodiments may include additional and/or alternative steps. It should also be appreciate that some embodiments may omit one or more steps without departing from the scope of this disclosure.

In a first step 201, a CCS server may generate a user record in a CCS database. During a registration process with a CCS service provider system, the user may download and install on a client device an application associated with the CCS system, or the user may use the client device to interact with a web-application hosted on a webserver of the CCS system. The user may provide user data information, such as demographic data and other identifying information, which may then be stored in a user record that is identifiable by a unique user identifier (user ID) uniquely associated with the user. The client device may also transmit device data and/or client application data to the CCS server, such as MAC address, IP address, application-instance identifier, and the like. The data may be used in generating any number of unique identifiers and/or credentials, authorizing data exchanges between devices, and performing any number of additional or alternative secure processes. After establishing the user credentials and the user record, the CCS server may authenticate the user through user credentials and/or through device credentials, such as a MAC address received from the client device. The authentication may occur at login, as well as instances where the CCS server is requested to execute a transaction, manipulate the user's funds, and/or update user information in the record of the user.

In a next step 203, after the CCS server has authenticated the user, the CCS server may receive a request for a payment card number from the client application of the client device. In some embodiments, the CCS server may receive various customization inputs from the user, such as aesthetic customizations and transaction configurations limiting the circumstances in which the CCS server may authorize payment transactions.

In a next step 205, the CCS server may generate a payment card number and a token representing the payment card number. The CCS server may generate the payment card number by appending together several sets of digits, including a predetermined bank identification number (BIN) prefix, a set of randomly generated digits representing a randomly generated number generated according to a random number generator algorithm, and one or more checksum digits generated and applied according to a checksum algorithm that confirms the uniqueness and accuracy of the new payment card number as a whole. Generally, the BIN prefix is a set of digits, typically six digits, associated with a bank or card issuer. The issuer processor or other entity may provide the BIN prefix to the CCS server; the CCS server may store the BIN prefix digits and may be configured to apply the BIN prefix digits to new payment cards generated by the CCS server, in accordance with the issuer processor or other entity. The CCS server may also generate a set of digits for the random number portion of the card number using a random number generator algorithm and generate a set of one or more digits based on a Luhn check algorithm (or other checksum algorithm) dictated by the issuer processor or other entity. The CCS server may append the set of one or more Luhn check digits to the randomly generated set of digits. The CCS server may then use the Luhn check digits to determine whether the randomly generated number is unique. The Luhn check digits and randomly generated digits may be appended to the BIN prefix together, at the same time, or individually, such that the Luhn check algorithm may determine the uniqueness of the randomly generated value with or without the BIN prefix value. In the example embodiment, the CCS server may use the Luhn check digits and the Luhn check algorithm to confirm that the payment card number, comprising the digits of the randomly generated number appended to the BIN prefix digits, is a unique payment card number that does not match a second payment card number. In the event the CCS server determines that the Luhn check fails, and thus there is a collision with a second payment card number (e.g., an existing or already-used payment card number), then the CCS server may continue generating sets of digits for a random number until the CCS server identifies a payment card number that satisfies the Luhn check algorithm, and does not match another payment card number. In some implementations, the CCS server may calculate a token for the payment card number, where the payment card number may be generated and stored in a high-security module of the same or different CCS server and CCS database, and the token may be exchanged with external entities and stored in any number of databases and devices, such as the client device and the databases of third-party entities. The CCS server may be configured to generate the token using an algorithm that uses a random number generator and one or more predetermined input values (e.g., user ID values, MAC address of client device). In some implementations, the tokenization algorithm may evolve or change over time, so as to require additional or alternative parameter inputs. The CCS server may execute a random number generator generates cryptographically secure random numbers according to the algorithm. One having skill in the art would recognize that when a computer generates cryptographically secure random numbers, it is distinguishable from what may ordinarily be considered as identifying a number randomly. It is understood that patterns may emerge over time when computers are instructed to select a number at random, and thus special functions must be constructed to handle very large numeric values or alphanumeric strings in order for the random numbers to be truly random, to avoid collisions, and to prevent attackers from reverse engineering a pattern.

In some embodiments, a CCS server may be configured to generate any number of payment card numbers or account number, for new payments cards or accounts, according to any number of predetermined rules that limit where and how the payment card number, physical payment card, or account number may be used in transactions. For example, a request for a new payment card received from a user may indicate that the user wants the CCS server to generate a payment card number that may only be authorized for transactions involving particular merchants or a certain category of merchants. Various customization or configuration interfaces may allow the user to select particular certain rules, or payment limitation parameters, which may be user-defined transaction authorization parameters limiting the application of payment card numbers stored in the user record of the CCS database. The user may indicate, for example, that a payment number or account number may only be authorized for transactions involving restaurants, and thus the record of the user may associate the payment card number or account number with a merchant category code (MCC) associated with restaurants. Accordingly, when the CCS server determines whether to authorize a payment transaction request involving the payment account number or account number, after the CCS server queries the record of the user in the CCS database, the CCS server will authorize transactions having transaction data identifying a merchant with a matching MCC, and reject transactions having transaction data that do not contain the matching MCC. As another example, the user may establish a rule linking the payment card number to transactions involving a particular merchant. In this example, the CCS server may authorize transactions where the transaction data of the payment transaction request message contains a string or data field indicating that the transaction involves the particular merchant. It should be appreciated that the determination of whether to authorize the payment based upon the user configurations is generated by the CCS server, rather than an external server, such as a core processor server. In some circumstances, an external server, such as a core processor server or bank server may determine that the payment should or could be authorized according to conventional criteria executed by these external entity devices, yet the CCS server may determine that the user has chosen not to honor payments outside of the user's preconfigured limitations.

Moreover, the CCS server may generate a plurality of payment card numbers or other account numbers in the user record that are associated with the user ID. Each user may generate multiple payment card numbers that are each distinct accounts to the merchants other entities, but are linked to the common bank account information according to the record of the user in the CCS database. As such, the user may request payment card numbers for dedicated merchants or merchant categories that the user may use for those particular merchants, yet the funds are drawn from the common, hidden account by the CCS server when the server matches the account number of the user with the payment card number generated according to the particular set of limiting rules or data fields.

In some embodiments, in an optional next step 206, where a bank may host a separate bank account for each individual user of the CCS services, the CCS server may request that the host bank open a new financial account for the user, and may receive account data (e.g., account number, routing number) in return. The CCS server may be configured to transmit to the bank servers, data from a user record containing additional Know-Your-Customer (KYC) data, according to the requirements of the host bank or regulations. The bank servers may transmit back to the CCS server the account information for the user's account after the account is established in the bank servers and bank databases.

Alternatively, in some embodiments, the host bank may establish and manage bank accounts for the CCS service provider, where funds may be deposited by the user into an account held by the CCS service. Although in the account of the CCS service at the host bank, the funds are owned by the user, which is reflected accordingly in the records of the various databases of the CCS and host bank, as well as the client application. In such embodiments, the payment card number may be associated with the user ID in the CCS databases in order to monitor the amount of money available to the user. When conducting transactions, the payment card number may be associated with the routing and account number of the CCS service provider's financial account held at the host bank.

In a next step 207, the CCS server may update the user record in the CCS database according to the payment card number generated by the CCS server, the token representing the payment card number, and, in some cases, the user account data generated and received from the bank server of the host bank. In later payment authorization processes, the CCS server may query the records of users in the CCS database according to any number of data fields, such as user IDs, routing numbers, bank-customer identifiers (bank-customer IDs), payment card numbers, token values representing payment card numbers, and the like.

In some implementations, the CCS server may update the record of the user based upon the account data (e.g., routing number, account number) received from the third-party host bank, thereby associating the new payment card number with the account data in the records of the CCS service provider. The host bank may additionally transmit a bank-customer identifier (bank-customer ID) uniquely identifying the user in the host bank database. This bank-customer ID may also be stored into the record of the user in the CCS database. In some embodiments, this bank-customer ID may function as a token or proxy for the routing number, and the CCS server may generate the account number that the CCS server may transmit to the host bank, issuer processor, and card printer.

In a next step 209, the CCS server may transmit the token representing the payment card number to the client device, an issuer processor, and/or a card printer service. The client device may store the token in a non-transitory machine-readable memory of the client device. The client application may access the token and display the payment card number via one or more GUIs; and the client application may access the token to transmit the token or payment card number to a merchant computing device or to another a client device in order to conduct a payment transaction through a digital environment, without requiring the physical payment card. In some implementations, the client device may also receive from an issuer processor server, a cryptogram token representing the payment card in a third-party digital wallet application. In embodiments where the CCS service provider functions as the issuer processor, the CCS server may generate the cryptogram token for the digital wallet application and transmit the cryptogram token to the client device.

In some embodiments, where the CCS service provider is a distinct entity from the issuer processor, the CCS server may transmit the payment card number to the issuer processor server. The issuer processor server may update an issuer processor database to reflect the newly issued payment card number, which may allow the issuer processor server to execute any number of authorization, verification, and/or authentication processes that protect the user and may ease the processing burden of CCS server, when payment transaction request messages are received from merchants, merchant-acquirers, and/or other client devices. The issuer processor may additionally update the databases of the payment network entity (e.g., Visa®, MasterCard®, American Express®) to indicate that the payment card number has been issued to operated accord the particular payment network rails.

The CCS server may transmit the payment card number to a server of a card-printing entity that is authorized by the issuer processor and/or payment network entity to print and ship physical payment cards to users. The payment card may be shipped to the user, who may then employ the payment card with the payment card number in payment transactions like any ordinary payment card. In some implementations, the CCS server may transmit graphical data to the card-printing entity, generated by the user through one or more design GUIs executed on the client application of the client device. Accordingly, the payment card may be customized according to the real-time payment card number generated in response to the user's request, and according to the aesthetic graphics generated by the user interacting with the design GUIs.

In some circumstances, at a next step 210, the CCS server may update an activation status data field in the record of the user, or some other database record, in a CCS database. As previously mentioned, due to the real-time generation of an active payment card number, the payment card number may be employed by the user as soon as the user receives the payment card number from the CCS server. As such, regardless of whether other entities, such as a core processor, would authorize a transaction associated with the payment card number, the CCS server may be configured to reject all transactions associated with the payment card number until the CCS database indicates that the card is activated. In this way, should a third-party intercept the physical payment card en route from the card-printing entity to the user, the CCS server will prohibit the third-party from fraudulently conducting any transactions using the payment card. After transmitting the payment card number to the client device, the client application may display the payment card number to the user, and may display on a graphical user interface (GUI) prompting the user to activate the payment card number.

In some implementations, users may be allowed to selectively update the activation status of a payment card number by submitting subsequent activation requests through the appropriate GUI present on the client application. This feature allows the user to continually and selectively "turn on" and "turn off" a payment card number listed in the database record of the user. Each subsequent request indicates to the CCS server whether to update the status field to indicate that the payment card number is activate or inactive, and thus indicates to the CCS server whether to authorize payment transaction requests associated with the payment card number.

In circumstances where the CCS server receives an initial or subsequent activation request from the client application of the client device (in previous step 210), then the CCS server, in a next step 211, may update the activation status field in the user record of the CCS database for the corresponding payment card number. Based on the activation request, the activation status field in the record of the user and/or record for the payment card number may indicate that the user has received or otherwise accepted the payment card number and the responsibilities for tracking the payments. In addition, the user has also indicated that CCS server should permit payment transaction requests linked to the payment card number, where the CCS would otherwise reject payment transaction requested associated with the payment card number by default. As previously mentioned, the CCS server may receive subsequent requests to deactivate the payment card number that instruct the CCS server to update the activation status field to indicate that the user wants to "turn off" or deactivate the payment card number, and thus instructs the CCS server to deny payment transaction requests when the CCS server queries the activation status field.

In a next step 212, when the CCS server receives a payment transaction request and associated transaction data, the CCS server may determine whether to permit the payment transaction based on any number of factors, including the activation status field in a database record associated with the payment card number. Because payment card numbers generated by the CCS server are technically active card numbers as far as other entities, external to the CCS, are concerned, it is possible that a new payment card number would be honored by various entities before the user or possess the new payment card number or before the user wants the new payment card number to be useable. For instance, a payment transaction request containing transaction data identifying the new payment card number may be received and processed by a core processor. The core processor may honor the payment card number and determine that the payment card number should be honored by an issue processor, merchant-acquirer, and/or a merchant. For security purposes, the CCS server may make a determination whether to honor the payment transaction request independently from the core processor or other external entities. Here, the CCS server may independently determine whether to accept or reject the payment transaction request based upon the activation status field associated with the new payment card number.

In a next step 213, after the CCS server receives a payment transaction request message from a payee (e.g., merchant), where the transaction requests indicate that the payment card number is involved in the transaction, the CCS server may receive from a core processor server, a payment authorization response message containing data about the transaction and indicating whether the CCS server and/or an issuer processor server should authorize the payment request. The CCS server may determine whether the card activation status field indicates that the payment card number has been activated. The CCS server may further determine whether to authorize the payment transaction according to any number of payment or transaction authorization parameters and criteria, such as an amount of funds in the account available to the user and the amount of the transaction. If the activation status field of associated with the payment card number indicates that the payment card number is activated by the user, then the CCS server may permit the payment by transmitting an authorization message to one or more entity systems, such as the banking system, the core processor, the issue processor, the merchant-acquirer, and/or the merchant. Likewise, regardless of whether any of the external entities would authorize the transaction, the CCS server may automatically deny, and thus transmit rejection messages to any of the external entity systems, when the CCS server determines that the activation status field associated with the payment card number indicates that the payment card number is not activated by the user.

In some implementations, the client device may present a GUI allowing the user to selectively activate and de-activate the payment card number. The input will instruct the CCS server to update the record of the user in the CCS database to indicate an activation status. Based on this activation status, the CCS server may determine whether to authorize payment transaction requests received from merchant computing devices or other payees (e.g., other client applications executed by client devices).

Similarly, in some embodiments, the user may selectively activate and de-activate payment card numbers associated with particular merchants in the user record. The CCS server may update the activation status field for the payment card number in the user record to indicate that the particular payment card number is activated or de-activated according to the user's selection. The CCS server may then authorize or reject payment transaction requests accordingly. For example, if a user has generated a payment card number that is associated with a particular merchant that charges a regular subscription fee, the user may de-activate the payment account number in the user record to stop the CCS server from authorizing payment transactions for that particular merchant, even when the other external entities may permit the transactions.

Example Registration Graphical User Interfaces

Figure 3:
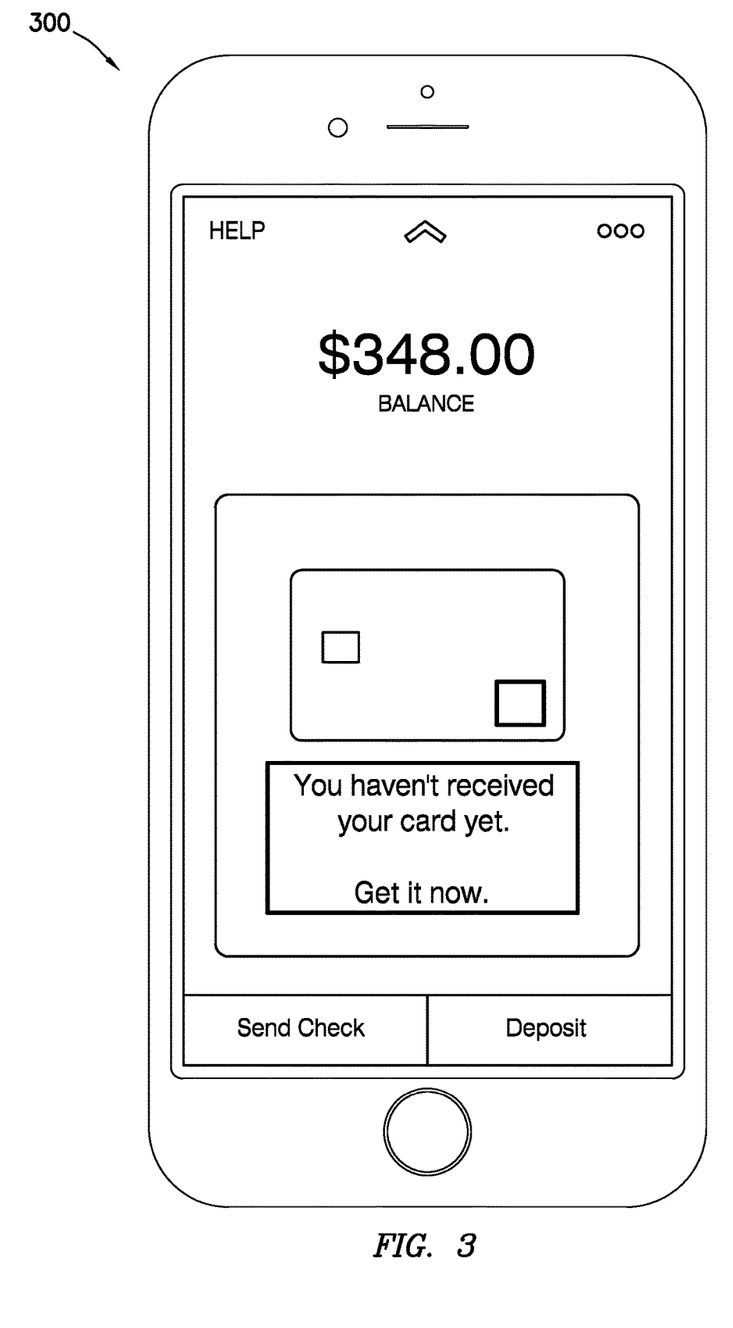
FIG. 3 shows a graphical user interface, according to an example embodiment.

FIG. 3 shows a graphical user interface (home screen GUI 300), according to an example embodiment. The home screen GUI 300 may be a home screen that shows various options and information about the user's account. The home screen GUI 300 may display an account balance, which may be an amount of money available to the user according to a user record stored in a CCS database or may be an amount of money indicated by the records or ledger of a third-party bank as indicated to the CCS server. The GUI 300 displays a graphical depiction of the user's payment card; but in some instances, as in the example embodiment, the GUI 300 may indicate that the user has not yet received the physical payment card, and/or has not yet activated the payment card number generated by the CCS server. In such circumstances, the home screen GUI 300 may provide a selectable button or hyperlink that instructs the client application to submit to the CCS server a request for a new payment card and/or a request for a new payment card number. The home screen GUI 300 may additionally provide options for the user comment various types of transactions, such as sending a check and depositing funds from an account at another financial institution.

Figure 4:
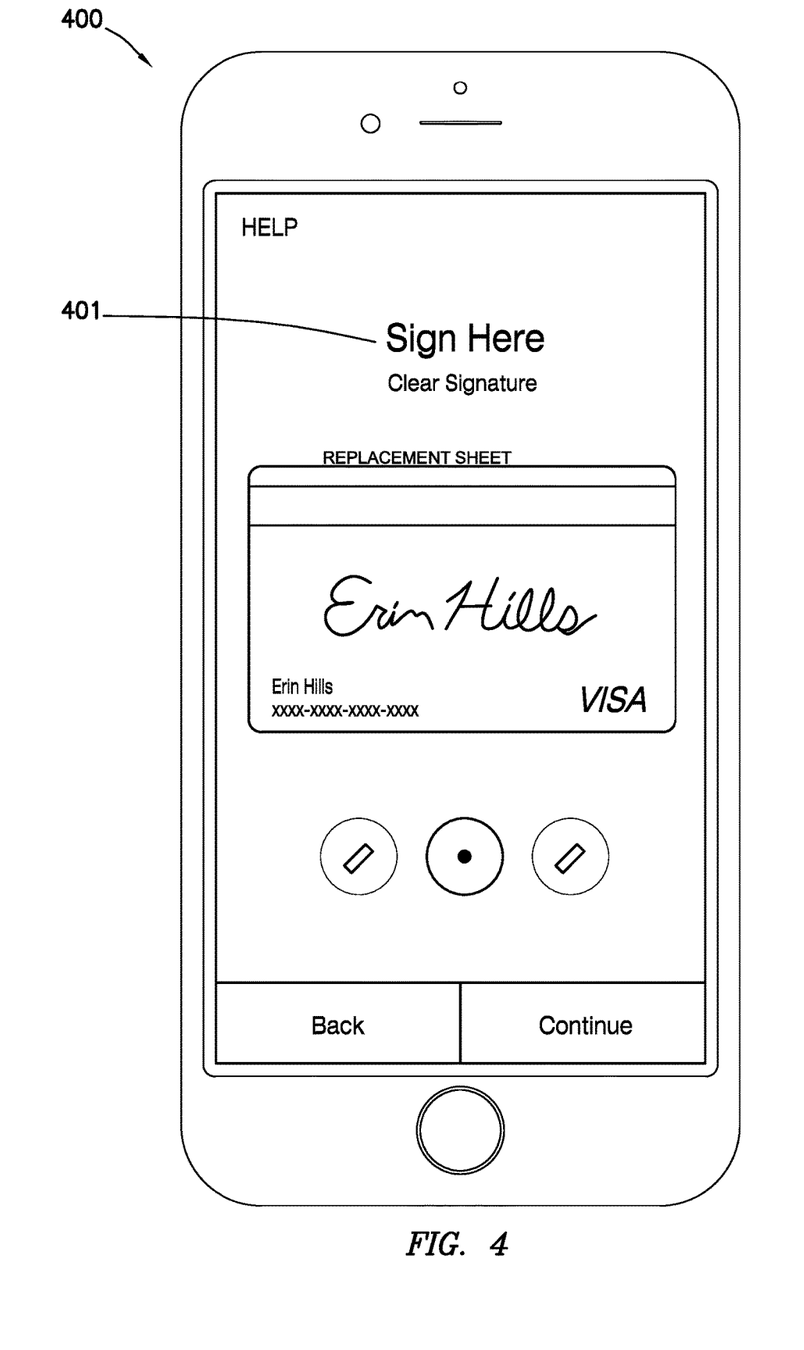
FIG. 4 shows a graphical user interface, according to an example embodiment.

FIG. 4 shows a graphical user interface (customization GUI 400), according to an example embodiment. After the user selects an option to generate and receive a new payment card on the home screen GUI 300, the client application may present a customization GUI 400 comprising one or more input fields 401 that capture inputs from the user, thereby allowing the user to input a signature into the customization GUI 400, and optionally aesthetically personalize the payment card through the client application. For example, the customization GUI 400 may capture the user's finger touch or stylus to generate a graphical display that traces the user's contact with the screen of the client device. When the user is satisfied with the personalization, the client device may save the graphical representation of the customized payment card in memory.

Figure 5:
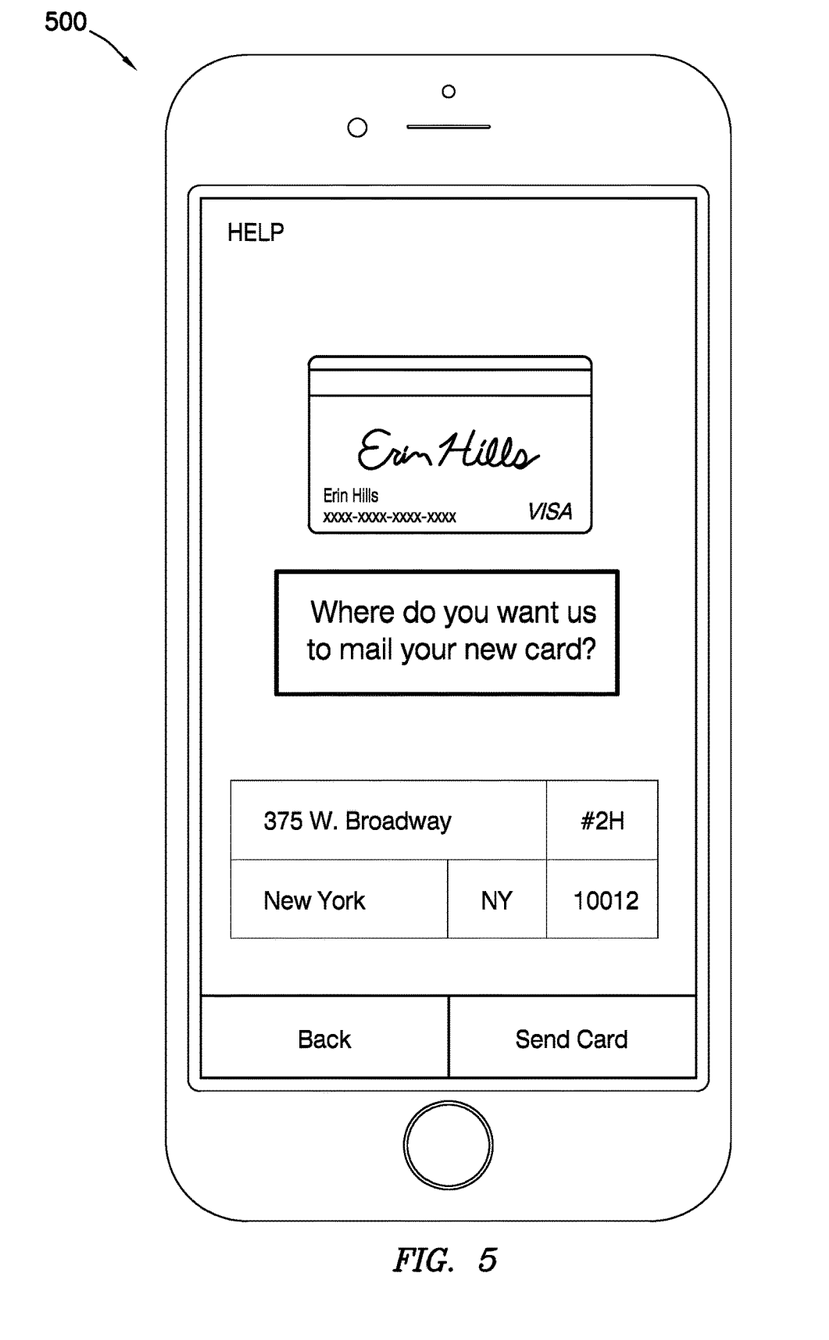
FIG. 5 shows a graphical user interface, according to an example embodiment.

FIG. 5 shows a graphical user interface (shipping GUI 500), according to an example embodiment. After completing the personalization of the payment card, a shipping GUI 500 may be presented to the user to capture the user's shipping address. The CCS server may forward this information from the client device to a server of a card-printing entity, along with the graphical representation of the payment card and the payment card number. The card-printing entity may be responsible for printing and shipping credit/debit cards according to a user's and/or a financial institution's specifications. In some implementations, the CCS server may use the information received via the shipping GUI 500 as an additional user verification step, by comparing the information received from the shipping GUI 500 against existing data records for the user that may be stored in the CCS database. In some implementations, when the user confirms submission of the shipping address information, the CCS server may be triggered to generate the payment card number.

Figure 6:
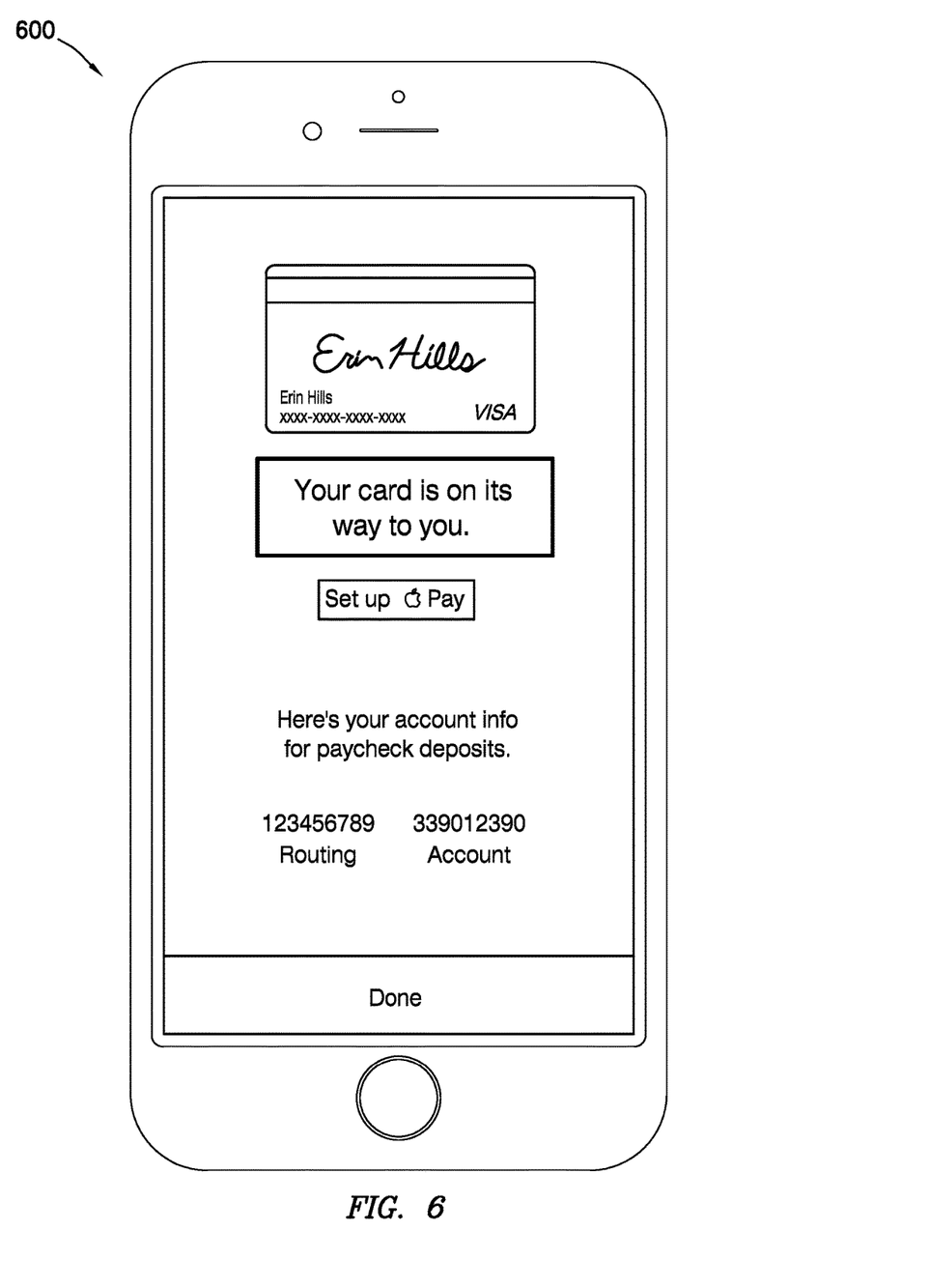
FIG. 6 shows a graphical user interface, according to an example embodiment.

FIG. 6 shows a graphical user interface (confirmation GUI 600), according to an example embodiment. The confirmation GUI 600 may display: a confirmation message indicating the payment card has been requested for the user's account, a graphical representation of the payment card, and information about the user's various accounts (e.g., account data, payment card number). The confirmation GUI 600 may also display selected options instructing the client application to request a cryptogram token for a third-party digital wallet application (e.g, Apple Pay®, Google Wallet®) executed by the client device. When the user selects the option to establish a cryptogram token for the digital wallet application, the input may instruct the client application and the client device to submit the payment card number to a computing device (e.g., issuer processor server, CCS server) configured to generate a compatible cryptogram token according to the digital wallet application requirements. The client device may then receive the cryptogram token from the computing device, and store the cryptogram token into memory accessible to the digital wallet application.

What is claimed is:

1. A computer-implemented method of generating payment account numbers for individual user accounts, the method comprising:

generating, by a computer in a user database, a user record comprising one or more data fields including a user identifier (ID) that identifies the user record, the user data associated with the user, and an amount of funds available to the user;

transmitting, by the computer, to a banking server of a third-party financial institution a request to open a banking account for the user, the request containing the user data associated with the user;

receiving, by the computer, from the client device a request to generate a unique payment account number, wherein the request contains device data associated with the client device that identifies the client device, and;

generating, by the computer in response to receiving the request to generate the unique payment account number;

determining, by the computer, that the unique payment account number does not match at least one second payment account number, wherein the computer continues to generate a next set of random digits for the unique payment account number until the unique payment account number does not match the at least one second payment account number;

generating, by the computer, using a tokenization algorithm and based upon a random number value, a token representing the unique payment account number;

receiving, by the computer, from the banking server, a bank-customer ID uniquely identifying the user in the banking server and account data for the banking account, the account data including an account number and a routing number;

storing, by the computer, into the one or more data fields of the user record in the user database: the bank-customer ID, the account data, the token representing the unique payment account number, and the unique payment account number;

transmitting, by the computer, the user data, the token representing the unique payment account number, and a graphical depiction of a payment card having the unique payment account number to a card-printing entity server for printing a physical payment card having the unique payment account number, the user data including a shipping address for a physical payment card;

transmitting, by the computer, to an issuer processor server coupled to an issuer database, the token representing the unique payment account number, and the user data associated with the user;

transmitting, by the computer, the token representing the unique payment account number to the client device;

receiving, by the computer, from the client device an activation request instructing the computer to update an activation status for the unique payment account number in the user record; and updating, by the computer, the activation status for the unique payment account number in the user record to indicate that the unique payment account number is activated.

2. The method according to claim 1 further comprising authorizing, by the computer, a transaction request containing transaction data received from a merchant computing device when the transaction request identifies the unique payment account number or the token representing the unique payment account number and when the computer determines that the activation status of the payment account number indicates that the payment account number is activated, wherein generating the unique payment account number comprises generating a set of random digits based upon one or more input parameters and using a random number generator algorithm, and generating the unique payment account number to include a bank identification number (BIN) prefix that comprises a predetermined set of digits.

3. The method according to claim 2, wherein receiving the request to generate the unique payment account number further comprises:

receiving, by the computer, one or more payment limitation parameters associated with the unique payment account number; and storing, by the computer, the one or more payment limitation parameters associated with the unique payment account number into the user record of the user database, wherein the computer further authorizes the transaction request when the transaction data of the transaction request received from the merchant computing device satisfies the one or more payment limitation parameters.

4. The method according to claim 3, wherein the computer declines the transaction request when the transaction data fails to satisfy the one or more payment limitation parameters.

5. The method according to claim 3, wherein a payment limitation parameter of the one or more payment limitation parameters is selected from the group consisting of a merchant name and a merchant category code.

6. A computer-implemented method of generating user payment account numbers for an account for a service provider entity, the method comprising:

generating, by a computer of the service provider entity, in a user database a user record comprising one or more data fields including a user identifier (ID) that identifies the user record, the user data associated with a user, and an amount of funds available to the user;

receiving, by the computer, from the client device a request to generate a unique payment account number, wherein the request contains client device data associated with the client device that identifies the client device, and generating, by the computer, using a tokenization algorithm, a token representing the unique payment account number;

generating, by the computer in response to receiving the request, the unique payment account number;

storing, by the computer, the token and the unique payment account number into one or more data fields of the user record in the user database;

transmitting, by the computer, to an issuer processor server coupled to an issuer database, the token representing the unique payment account number, and the user data associated with the user;

transmitting, by the computer, to the client device the token representing the unique payment account number, wherein the client device is configured to display a graphical representation of the unique payment account number;

receiving, by the computer, from the client device an activation request instructing the computer to update an activation status for the unique payment account number in the user record; and updating, by the computer, the activation status for the unique payment account number in the user record to indicate that the unique payment account number is activated.

7. The method according to claim 6, further comprising authorizing, by the computer, a transaction request containing transaction data received from a merchant computing device when the transaction request identifies the unique payment account number or the token representing the unique payment account number and when the computer determines that the activation status of the unique payment account number indicates that the unique payment account number is activated, wherein generating the unique payment account number includes a bank identification number (BIN) prefix that comprises a predetermined set of digits.

8. The method according to claim 7, wherein receiving the request to generate the unique payment account number further comprises:

receiving, by the computer, one or more payment limitation parameters associated with the unique payment account number; and storing, by the computer, the one or more payment limitation parameters associated with the unique payment account number into the user record of the user database, wherein the computer further authorizes the transaction request when the transaction data of the transaction request received from the merchant computing device satisfies the one or more payment limitation parameters.

9. The method according to claim 8, wherein the computer declines the transaction request when the transaction data fails to satisfy the one or more payment limitation parameters.

10. The method according to claim 8, wherein a payment limitation parameter of the one or more payment limitation parameters is selected from the group consisting of a merchant name and a merchant category code.

11. The method according to claim 6, further comprising determining, by the computer, that the unique payment account number does not match at least one second payment account number based upon a check algorithm using a check digit included in the unique payment account number, wherein the computer continues to generate a next set of random digits for the unique payment account number until the unique payment account number does not match the at least one second payment account number according to the check algorithm.

12. The method according to claim 6, further comprising transmitting, by the computer, the user data and the token representing the unique payment account number, to a card-printing entity server for printing a physical payment card having the unique payment account number, the user data including a shipping address for the physical payment card.

13. A computer-readable storage medium storing instructions that, when executed by a computer, cause the computer to execute operations of:

receiving, by the computer, from a client device associated with a user, a request for a unique payment account number associated with the user;

generating, by the computer in response to receiving the request, the unique payment account number;

generating, by the computer, a token representing the unique payment account number using a tokenization algorithm, wherein the token includes the unique payment account number;

storing, by the computer, the token and the unique payment account number into a user record stored in a database configured to store one or more user records of one or more users respectively; and transmitting, by the computer, the token representing the unique payment account number to the client device of the user and to a server of an issuer processor.

14. The computer-readable storage medium according to claim 13, the instructions further causing the computer to execute the operations of:

receiving, by the computer, from a merchant computing device via one or more payment network rails a transaction request message containing transaction data identifying the unique payment account number; and transmitting, by the computer, to the merchant computing device, a payment authorization response message responsive to the transaction request message containing transaction data identifying the unique payment account number, wherein the computer generates the payment authorization response message based upon one or more transaction authorization parameters, wherein generating the unique payment account number comprising using a random number generator, wherein the computer continually generates the unique payment account number until the computer determines that the unique payment account number does not match at least one second payment account number.

15. The computer-readable storage medium according to claim 14, the instructions further causing the computer to execute the operations of:

determining, by the computer, an activation status of the unique payment account number according to a status of the unique payment account number in the user record, wherein the one or more transaction authorization parameters includes the activation status of the unique payment account number.

16. The computer-readable storage medium according to claim 15, the instructions further causing the computer to execute the operations of:

determining, by the computer, that the activation status of the unique payment account number in the user record indicates the unique payment account number is not activated; and transmitting, by the computer, to the merchant computing device a payment declined message responsive to the transaction request message, in response to determining that the activation status of the unique payment account number is not activated.

17. The computer-readable storage medium according to claim 15, the instructions further causing the computer to execute the operations of:

receiving, by the computer, an activation request from the client device; and updating, by the computer, the activation status of the unique payment account number in the user record, in response to the activation request, wherein the activation status of the unique payment account number is updated to indicate the unique payment account number is activated.

18. The computer-readable storage medium according to claim 17, the instructions further causing the computer to execute the operations of:

determining, by the computer, that the activation status of the unique payment account number in the user record indicates that the unique payment account number is activated; and transmitting, by the computer, to the merchant computing device the payment authorization response message in response to the computer determining that the activation status of the unique payment account number is activated.

19. The computer-readable storage medium according to claim 14, the instructions further causing the computer to execute the operations of:

updating, by the computer, the user record according to an amount of funds indicated by the transaction request message, upon transmitting a payment authorization response message to the merchant computing device; and transmitting, by the computer, to a banking server the amount of funds indicated by the transaction request message, and instructions to update an account of a service provider entity according to the amount of the transaction request message.

20. The computer-readable storage medium according to claim 14, the instructions further causing the computer to execute the operations of:

transmitting, by the computer, a request for a user account to a banking server;

updating, by the computer, the user record for the user according to account data received from the banking server; and upon the computer transmitting a payment authorization response message to the merchant computing device, transmitting, by the computer, an amount of the transaction request message and the account data to the banking server.

21. The computer-readable storage medium according to claim 14, the instructions further causing the computer to execute the operations of:

storing, by the computer, into the user record, one or more payment limitation parameters associated with the unique payment account number and received from the client device, wherein the one or more transaction authorization parameters includes the one or more payment limitation parameters of the user.

22. The computer-readable storage medium according to claim 13, the instructions further causing the computer to execute the operations of:

transmitting, by the computer, a request for a physical payment card having the unique payment account number to a server of a card-printing entity, the request for the physical payment card including at least a portion of user data associated with the user stored in the user record containing an address.

23. The computer-readable storage medium according to claim 22, the instructions further causing the computer to execute the operations of:

receiving, by the computer, from the client device, one or more graphical depictions of the physical payment card associated with the unique payment account number, wherein the request for the physical payment card further includes the one or more graphical depictions of the physical payment card.

24. A computing system comprising:
a user database hosted on one or more computing devices comprising non-transitory machine-readable storage media configured to store one or more user records of one or more users respectively; and
a server coupled to the user database and comprising a processor configured to:
in response to receiving a request for a unique account number from a client device, generate the unique account number;
generate using a tokenization algorithm a token representing the unique account number;
store, into a user record, data comprising the token and the unique account number;
transmit to the client device and to a server of an issuer processor the token representing the unique account number; and
receive a transaction request message containing transaction data identifying the unique account number from a merchant computing device via one or more payment network rails.

25. The computing system according to claim 24, wherein the server is further configured to:
generate the unique account number using a random number generator, wherein the computer is configured to continually generate the unique account number according to the random number generator until the computer determines that the unique account number does not match at least one second account number; and
transmit to the merchant computing device a payment authorization response message responsive to the transaction request message, wherein the computer generates the payment authorization response message based upon one or more transaction authorization parameters and the data stored in the user record.

26. The computing system according to claim 25, wherein the server is further configured to determine an activation status of the unique account number according to the user record, and wherein the one or more transaction authorization parameters includes the activation status of the unique account number.

27. The computing system according to claim 26, wherein, upon the server determining that the activation status of the unique account number in the user record indicates the unique account number is not activated, the server is further configured to transmit to the merchant computing device a payment declined message responsive to the transaction request message.

28. The computing system according to claim 26, wherein the server is further configured to:
receive an activation request from the client device; and
update the activation status of the unique account number in the user record in response to the activation request, wherein the activation status of the unique account number updated to indicate the unique account number is activated.

29. The computing system according to claim 28, wherein, upon the server determining that the activation status of the unique account number in the user record indicates that the unique account number is activated, the server is further configured to transmit to the merchant computing device a payment authorization message in the response message.

30. The computing system according to claim 25, wherein the server is further configured to:
update the user record according to an amount of funds for a transaction indicated by the transaction request message, upon the server transmitting a payment authorization response message to the merchant computing device; and
transmit to a banking server the amount of funds for the transaction, and instructions to update an account of a service provider entity according to the amount of funds for the transaction.

31. The computing system according to claim 25, wherein the server is further configured to:
transmit a request for a user account to a banking server, and update the user record for the user according to account data received from the banking server; and
wherein, upon the computer transmitting a payment authorization response message to the merchant computing device, the server is further configured to transmit an amount of a transaction indicated by the transaction request message and the account data to the banking server.

32. The computing system according to claim 25, wherein the server is further configured to store into the user record, one or more payment limitation parameters associated with the unique account number and received from the client device, and wherein the one or more transaction authorization parameters includes the one or more payment limitation parameters of the user.

33. The computing system according to claim 24, wherein the server is further configured to:
transmit a request for a physical payment card having the unique account number to a second server of a card-printing entity, the request for the physical payment card including at least a portion of the user data stored in the user record containing an address.

34. The computing system according to claim 33, wherein the server is further configured to receive, from the client device, one or more graphical depictions of the physical payment card associated with the unique account number, and
wherein the request for the physical payment card further includes the one or more graphical depictions of the physical payment card.

* * * * *